Figure 4:
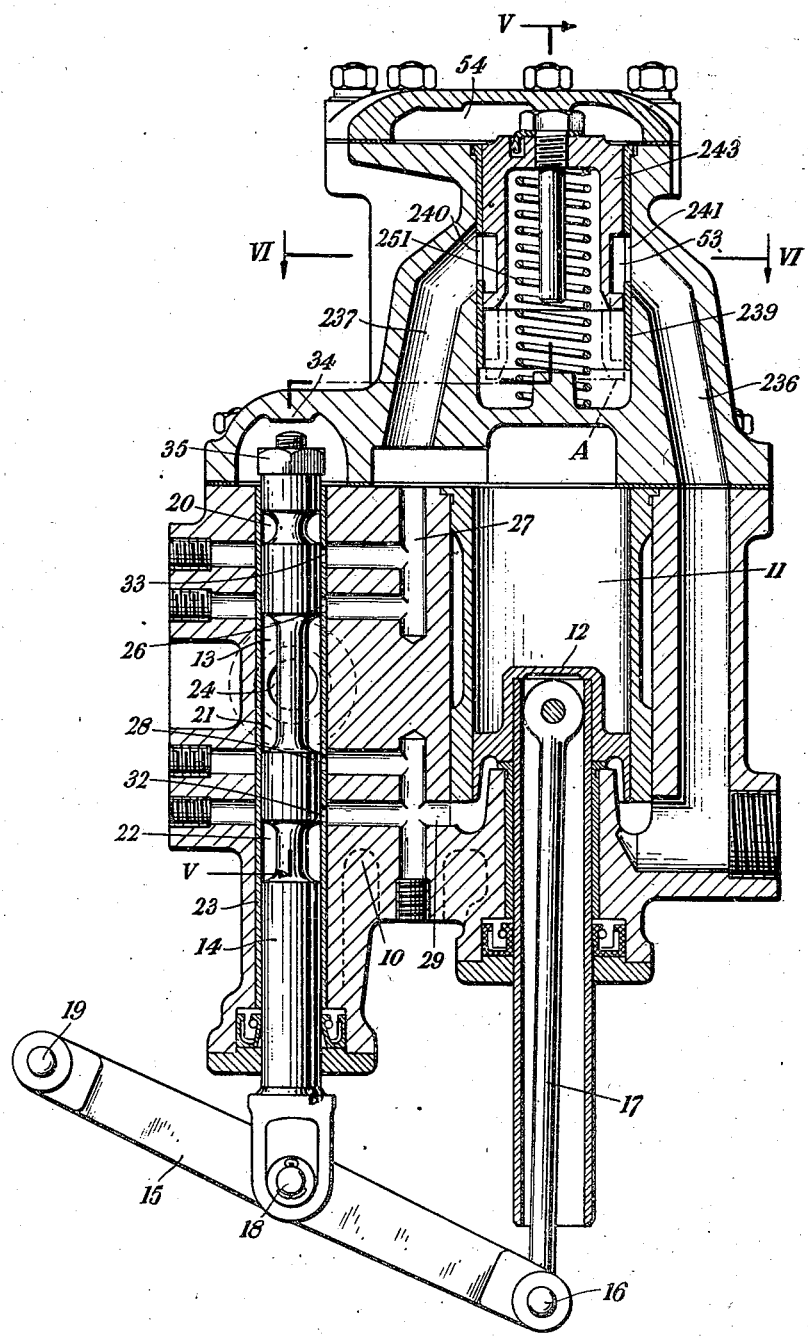

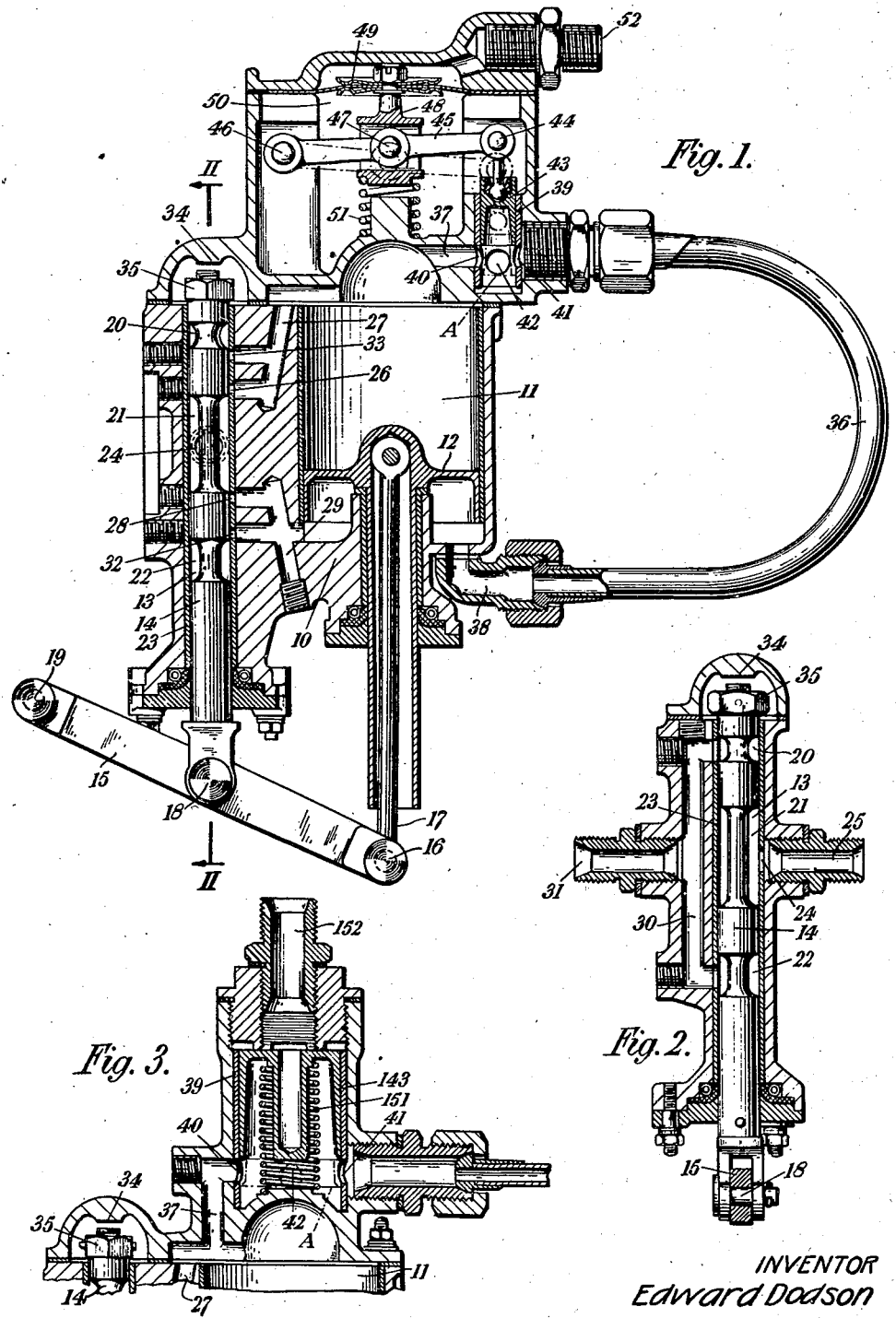

INVENTOR
Edward Dodson
BY Moses & Nolte
ATTORNEYS

May 19, 1942.                  E. DODSON                    2,283,541
                               SERVO MOTOR
                        Filed Sept. 26, 1940           3 Sheets-Sheet 3

INVENTOR
Edward Dodson
BY Moses & Nolte
ATTORNEYS

Patented May 19, 1942

2,283,541

UNITED STATES PATENT OFFICE 2,283,541

SERVOMOTOR

Edward Dodson, Putney Heath, London, England

Application September 26, 1940, Serial No. 358,414
In Great Britain October 21, 1939

5 Claims. (Cl. 121—41)

This invention relates to hydraulic servo motors of the type comprising a cylinder containing a piston, a piston valve which, when displaced from its central position, by supplying pressure fluid to the portion of the cylinder on one side of the piston and connecting the portion of the cylinder on the other side of the piston to exhaust, causes the piston to travel in the opposite direction to the piston valve, and a floating actuating link pivoted both to the piston rod and to the piston valve.

With such a servo motor, on application of a given movement to the free end of the actuating link, the latter pivots on its point of connection to the piston rod and displaces the piston valve. This causes the piston to move in the reverse direction, thereby, through the agency of the actuating link, returning the piston valve to its central position, whereupon the piston is brought to a stop having travelled a distance determined by the initial displacement of the free end of the actuating link. If therefore the free end of the actuating link is coupled to a hand control (e. g. a throttle control) and the piston rod is connected to an apparatus to be operated (e. g. the throttle valve of an aircraft carburetter), the distant apparatus will, by the servo action, always be actuated to an extent determined by the displacement of the hand control.

If the supply of pressure fluid should fail for any reason, it is still possible to operate the apparatus because displacement of the hand control will cause the actuating link to act directly on the piston in place of the servo action through the piston valve. This however may entail considerable effort owing to the necessity of forcing the pressure fluid through the passages around the piston valve and the conduits interconnecting these passages and the two ends of the cylinder.

With a view to avoiding this difficulty, the invention provides a hydraulic servo motor of the type described having a by-pass conduit between the two ends of the cylinder controlled by a relief valve, which is normally held closed by the pressure of the fluid supply but is biased to open the conduit in the event of said pressure failing. In the event of the pressure failing therefore, the bye-pass conduit is automatically opened so affording a ready passage for the fluid from one side of the piston to the other and facilitating manual operation thereof.

Thus the pressure fluid may be arranged to act on a diaphragm arranged to hold the relief valve closed against the action of a spring so long as the pressure is maintained. If however the pressure should fail, the spring will at once act to open the relief valve. Alternatively, the pressure fluid may be arranged to act directly on the relief valve or to act on it through the intermediary of a piston, a spring again being provided for opening the relief valve in the event of the pressure failing.

Figure 6:
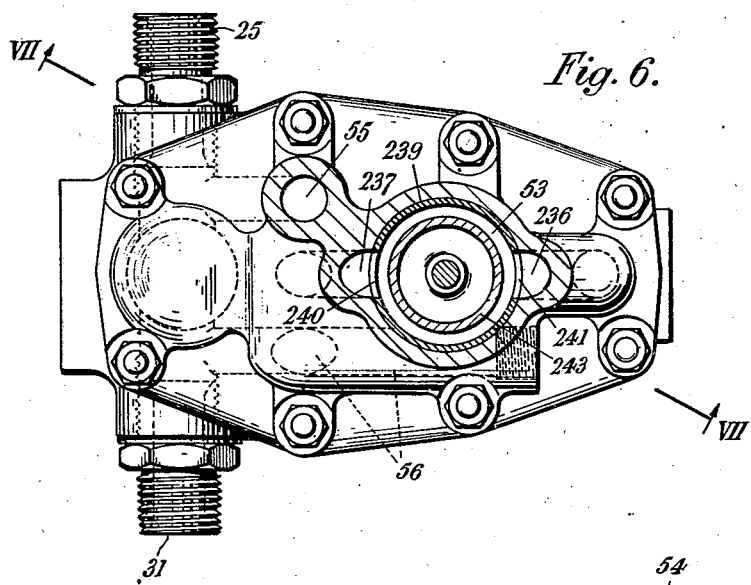
Figure 7:
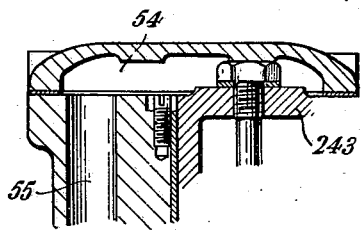
Figure 5:
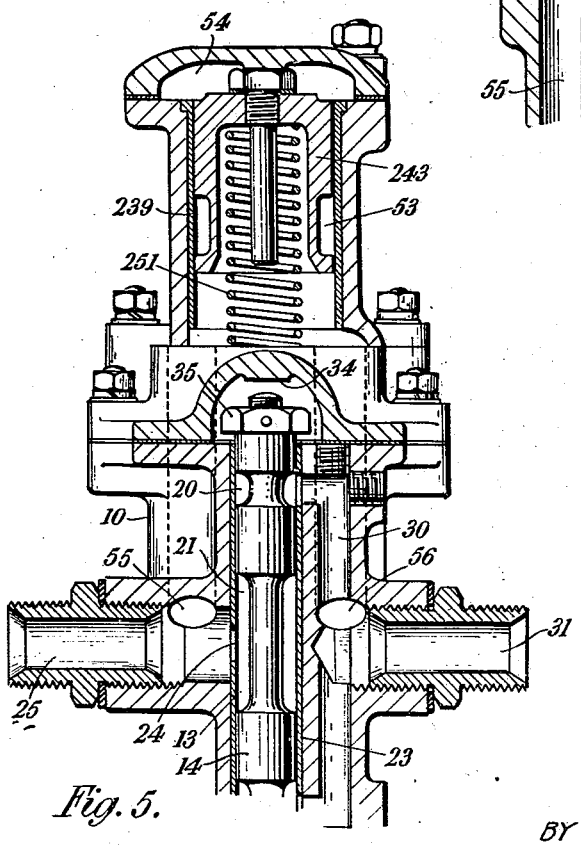

Some practical embodiments of the invention will now be described in detail, by way of example, with reference to the accompanying drawings in which:

Fig. 1 is a vertical section through one form of servo motor according to the invention, Fig. 2 is a section on the line II—II in Fig. 1, Fig. 3 is a vertical section through the upper portion of a modified form of servo motor, Fig. 4 is a vertical section through another form of servo motor according to the invention, Figs. 5 and 6 are sections taken respectively on the lines V—V and VI—VI in Fig. 4, and Fig. 7 is a section taken on the line VII—VII in Fig. 6.

Like reference numerals indicate like parts throughout the drawings.

The servo motor shown in Fig. 1 comprises a casing 10 within which is formed a cylinder 11 containing a piston 12. In the casing is formed another cylinder 13 containing a piston valve 14 disposed parallel to the piston 12. The piston valve 14 and piston 12 are interconnected by a floating actuating link 15 pivoted at one end 16 to the piston rod 17 and pivoted at a point 18 intermediate of its length to the piston valve. In use, the free end 19 of the actuating link is connected to a manual operating member (e. g. the throttle control of an aircraft) and the end 16 of the actuating link is connected to the apparatus to be driven by the servo motor (e. g. the throttle valve of an aircraft engine carburetter).

The piston valve 14 is formed with three annular transfer ports 20, 21, 22. The piston valve cylinder has a liner 23 formed with a port 24 by means of which the central transfer port 21 is maintained in permanent communication with the inlet 25 for the pressure oil. If the piston valve 14 is lifted from the central position illustrated, a port 26 in the liner will be uncovered and pressure oil will therefore be able to flow through this port and a passage 27 to the portion of the cylinder 11 above the piston 12. Similarly, if the piston valve is lowered from its central position, a port 28 will be uncovered and pressure oil will be able to flow through a passage 29 to the portion of the cylinder 11 below the piston 12. The end transfer ports 20, 22 are in permanent communication by means of a passage 30 (Fig. 2) with an exhaust outlet 31. When the piston valve is lifted from its central position a port 32 is uncovered, thereby connecting the portion of the cylinder 11 below the piston 12 to exhaust through the passage 29, ports 32, 22 and passage 30. Similarly, if the piston valve is lowered from its central position, a port 33 is uncovered, thereby connecting the upper portion of the cylinder 11 to exhaust through the passage 27, ports 33, 20 and passage 30. Any displacement of the piston valve 14 from its central position will therefore result in movement of the piston 12 in the opposite direction.

If now the manual operating member controlling the free end 19 of the actuating link is given a movement to displace said free end downwards, the link will first of all pivot about its other end 16 and lower the piston valve from its central position. This will cause the piston to rise, and thereby return the piston valve to its central position, the link 15 now pivoting about its displaced end 19 and the movement stopping as soon as the piston valve reaches the central position. The piston 12 and consequently the throttle valve or other apparatus connected to the end 16 of the link 15, will therefore execute a definite movement determined by the displacement of the other end 19 of the link by the hand control. If the end 19 of the link 15 is displaced upwardly, the piston valve 14 will be lifted, and the piston 12 caused to travel downwards to an extent corresponding to the upward movement given to the free end 19 of the link 15. In Fig. 1 the piston 12 is shown in its bottom position, but it will be understood that when the apparatus is in use it may occupy any position in the cylinder 11 depending upon the setting of the hand control connected to the free end 19 of the link 15.

If the supply of pressure fluid should fail, the operator can still work the apparatus by direct hand operation in place of the described servo action. In this case the first effect of movement of the free end 19 of the link is to move the piston valve 14 up or down as the case may be, until it reaches the limit of its permissible travel in its cylinder 13. Thereafter the link 15 will pivot about its attachment 18 to the piston valve and the piston 12 can consequently be given a direct manual operation. The travel of the piston valve upwards in its cylinder is limited by the end of the piston valve striking a stop 34 at the top of the cylinder. Its travel downwards is limited by a nut 35 on the piston valve coming into contact with the top of the liner 23.

Direct manual operation of the piston 12 by the hand control in the event of the fluid pressure failing may however be onerous owing to the necessity of transferring oil or other pressure fluid from one side of the piston to the other through the narrow passages and ports associated with the piston valve. A bye-pass pipe 36 is accordingly provided which communicates at its upper and lower ends with passages 37, 38 leading respectively to the upper and lower ends of the cylinder. In the passage 37 is located a transverse plug 39 formed with aligned ports 40, 41 communicating respectively with the passage 37 and bye-pass pipe 36, and a port 42 at a slightly lower level which leads to exhaust.

In the plug 39 is slidably mounted a relief valve constituted by a piston valve 43 connected to one end 44 of a lever 45 pivoted at its other end 46 to the casing. The lever 45 is pivoted centrally at 47 to a carrier 48 attached at its upper end to a diaphragm 49 extending across a chamber 50 formed in the upper part of the casing. A spring 51 tends to lift the lever 45 and hold the relief valve 43 in the open position shown in the drawings. The upper portion of the chamber 50 is however in communication through an inlet 52 with the pressure fluid, and when the fluid is operative the diaphragm 49 is depressed against the action of the spring 51, thereby lowering the relief valve 43 into the closed position in which its lower edge is at the level shown by the line A. The exhaust port 42 is not completely closed by the relief valve until after the bye-pass thus avoiding unnecessary resistance to the movement of the relief valve.

So long as the fluid pressure is maintained therefore the diaphragm 49 overpowers the spring 51 and holds the relief valve 43 in position to close the bye-pass. Immediately the pressure fails however, the spring 51 will lift the relief valve and open the bye-pass, thus affording an easy passage for oil from one side of the piston to the other and facilitating direct manual operation of the piston.

In place of employing a diaphragm for controlling the movement of the relief valve, the pressure oil may be arranged to act directly on the upper end of the latter as shown in Fig. 3, which shows a servo motor identical with that in Figs. 1 and 2 apart from the details of the relief valve. In this case the upper end of the hollow piston valve 143 is exposed directly to the pressure oil entering through the inlet 152, so that when the pressure is on, the valve is held closed against the action of a spring 151 which is located within and acts directly on the valve. Immediately the pressure is relieved however, the spring will lift the relief valve and open the bye-pass.

The servo motor shown in Figs. 4–7 is again generally similar to those previously described, differing only in the form of the bye-pass passage, relief valve, and means for supplying fluid pressure for controlling the relief valve. In this case the bye-pass is constituted by a passage 236 formed internally in the casing 10, and communicating at its lower end with the bottom of the cylinder, and at its upper end with a passage 237 leading to the top of the cylinder. Between the passages 236, 237 is located a plug 239 having opposed orifices 240, 241 in register with the passages 237, 236. The relief valve is constituted by a hollow piston valve 243 slidably mounted in the plug and biassed towards the open position by an internal spring 251. The relief valve is formed with an annular groove 53 which acts, when the valve is in the open position, as a transfer port, to permit fluid to flow between the passages 236, 237. With this arrangement the pressure oil is unable to obtain access to the underside of the piston valve 243 where it might, in some cases, cause delay and hysteresis in the closing of the valve when fluid pressure is applied to the system.

In the case of the servo motor shown in Figs. 4–7, the fluid pressure is applied directly to the top of the relief valve 243 from the same inlet 25 as that serving for the supply of pressure fluid to the piston valve 14. The inlet 25 communicates directly with the space 54 above the relay valve by means of a passage 55 (Figs. 5 and 7). Any oil which may leak down below the relief valve is returned to exhaust through a passage 56 (Fig. 5).

It will be understood that the relief valve need not necessarily be a piston valve but that other types of valve may be used for the purpose, for instance, a poppet valve controlled by the pressure fluid through the agency of a diaphragm or piston.

What I claim as my invention and desire to secure by Letters Patent is:

1. A hydraulic servo motor comprising a unitary casing including a body and a head detachably mounted on the body, a cylinder in the casing body extending through an end thereof in register with the head, a piston in the cylinder, a piston valve construction controlling the supply of pressure fluid to the cylinder and located in the casing at one side of the cylinder, operating mechanism connecting the piston and the valve at the end of the casing opposite to the head and a piston by-pass construction including a passage extending into the head and connecting the ends of the cylinder, a valve in the passage located in the casing head, and valve actuating mechanism located in said head, including a spring arranged to move the valve into open position, and fluid pressure actuated means including a pressure chamber for closing the valve.

2. A hydraulic servo motor as set forth in claim 1 in which the by-pass valve is exposed directly to the pressure of the fluid and is normally held closed by said pressure.

3. A hydraulic servo motor as set forth in claim 1 including a diaphragm exposed to the pressure of the fluid in the pressure chamber and operatively connected to the by-pass valve.

4. A hydraulic servo motor as set forth in claim 1 in which the valve is connected to an exhaust outlet and is arranged to connect the by-pass passage to said outlet in the open position of the valve.

5. A hydraulic servo motor comprising a casing, a cylinder in the casing, a piston in the cylinder, a piston valve construction controlling the supply of pressure fluid to the cylinder, operating mechanism connecting the piston and the valve, and a piston by-pass construction including a passage connecting the ends of the cylinder, a valve in the passage and valve actuating mechanism, said valve including a valve chamber having ports connected to spaced portions of the passage and an exhaust port located beyond the passage ports, and a valve member movable axially in the chamber across at least one of the passage ports to disconnect said portions of the passage, and thereafter across the exhaust port.

EDWARD DODSON.